INVENTOR.
DONALD A. BROWN.

INVENTOR.
DONALD A. BROWN

United States Patent Office 3,418,636
Patented Dec. 24, 1968

3,418,636
SEISMIC SHOT FIRING SYSTEM CONTROLLED
BY TUNED CIRCUIT
Donald A. Brown, Indiana Township, Allegheny County,
Pa., assignor to Gulf Research & Development Company, Pittsburgh, Pa., a corporation of Delaware
Filed Aug. 24, 1965, Ser. No. 482,122
7 Claims. (Cl. 340—171)

ABSTRACT OF THE DISCLOSURE

A system for initiating a current at a remote location within an accurately controlled time, about one-half millisecond, after actuation of a switch at an operator's location over a radio communication channel. A resonant circuit at the operator's location produces a characteristic weighting function, the amplitude of which will exceed the threshold of current triggering means at the remote location within the time accuracy required. The invention is particularly useful in the seismic exploration work.

---

This invention relates to a remote signaling system and in particular relates to a system for initiating a remote operation at a precise instant subsequent to signaling the operation, as for example in remote firing of a seismic prospecting shot.

In many signaling operations it is desired to initiate a remote operation by a signal that is transmitted over a communication channel, such as radio to the remote location. Usually though not always, some form of remote monitoring is provided in order that the operator may be assured that the operation was actually carried out. The operation may actually be carried out sooner or later after receipt of the signal at the remote point, and the monitor's signal showing completion of the operation is usually sufficient information. However, in certain remote signaling operations it is desired that the remote operation take place precisely at a predetermined time interval (which may be substantially zero) after the signal is given. This invention provides such a signaling system.

The invention will be described as applied to a well-known type of seismic prospecting operation. In such seismic operations a charge of explosive is detonated in a shallow borehole to initiate a seismic wave. The resulting earth tremors are received at a plurality of points on the surface of the earth by means of electrical seismometers whose signals are recorded on a common recording tape or drum. It has been customary to record on the record a signal derived directly from the detonation of the explosive, this instant being termed the time break or shot moment. Time-interval marks are also put on the record so that the travel time of any recorded seismic event may be accurately determined.

In recent years such multichannel seismograms have been made in magnetically recorded form on magnetic tape in order that the seismic signals may subsequently be conveniently reproduced for various types of electronic processing and/or converted to visible form for visual analysis in well-known manner. In such electronic processing of the seismogram it has heretofore been necessary to locate the shot-moment impulse on the magnetic tape and to align the tape on the processing apparatus with the shot moment at a standard index point on the reproducing drum. This is a tedius and time-consuming operation which cannot always be done with the precision desired. In attempting to overcome this difficulty the prior-art devices have employed a cam-actuated switch on the recording drum and have attempted to fire the explosive from a signal from such a switch. It has however been commonly found that the shot moment on successive shots still varies erratically by several milliseconds with respect to the drum position whenever radio transmission of the switch signal is employed. Accordingly, in all published systems it has been necessary to monitor and record the actual shot moment, as is done, for example, in United States Patent No. 3,039,558. This is necessary so that the recorded seismic events may be timed with the required precision, and to provide the exact time correction for each individual seismogram when it is subsequently reproduced for automatic processing.

In the prior art seismograph shot-firing systems, various causes are known to produce erratic behavior in the firing time. Signal channels that include mechanical relays have been found to have erratic variations in the position of the shot moment with respect to the beginning of the magnetic tape. Tuned circuits such as are found in radio channels are often adjusted to different IF values or to include different R-C time-constant circuits and the like, and channels using such circuits are characterized by varying delay times. While a small fixed delay can usually be taken care of without difficulty in the electronic seismogram-processing equipment, variations in this delay due to temperature variations, battery voltage, humidity changes, aging of the apparatus and the like, introduce unknown and intolerable errors. Heretofore-known radio-controlled seismic shot-firing systems commonly introduce time delays that are not constant but vary erratically between two and ten milliseconds or more, whereas in present-day seismogram-processing techniques a precision of one-half millisecond or better is desired. Moreover, it is desired to be able to mount each magnetic seismogram on a fixed fastening on the reproducing drum and be sure that the actual shot moment will always fall at the same point on the drum within the desired precision. Therefore, it is necessary that the shot moment always take place at a particular point on the rotating recording drum with a precision at least as good as that employed in other seismogram-processing techniques. A precision of ± one-half millisecond is easily achieved with the present invention. An ancillary advantage then follows from the present invention in that it becomes unnecessary to actually monitor and record the actual shot moment since its point of occurrence on the magnetic record will always be known to within the desired degree of precision.

It is accordingly an object of this invention to provide a method and apparatus by means of which a remote radio-controlled operation can be carried out at a precisely known and substantially zero time interval after a signal is given.

It is a further object of this invention to provide a method and apparatus for initiating through a radio channel an electric current in response to actuation of an electromechanical switch located at a remote point with a precisely constant and substantially zero time delay between actuation of the switch and initiation of the current.

It is a further object of this invention to provide a method and apparatus by means of which a seismic prospecting shot can be detonated at a precisely known and accurately constant time interval after a radio transmitted shot-moment signal is given.

It is a further object of this invention to provide a method and apparatus by means of which a radio-controlled seismic prospecting shot can be detonated precisely at a fixed point on a rotating seismograph recording drum.

It is a still further object of this invention to provide a method and apparatus by means of which the time delay between a recording drum-actuated signal and the actual radio-controlled shot moment in a seismic prospecting operation is precisely constant.

It is a still further object of this invention to provide a method and apparatus by means of which the time delay between a recording drum-actuated signal and the actual radio-controlled shot moment in a seismic prospecting operation is substantially zero and free of any significant variation.

A still further object of this invention is to provide a method and apparatus by means of which a radio-controlled shot moment in a seismic prospecting operation always occurs precisely at the same point on the recording drum so that the recordation of the actual shot moment may be dispensed with.

These and other useful objects of this invention are attained by the method and apparatus described in this specification of which the drawings form a part and in which FIGURE 1 is a schematic wiring diagram of the apparatus employed at the recording site;

Figure 1:
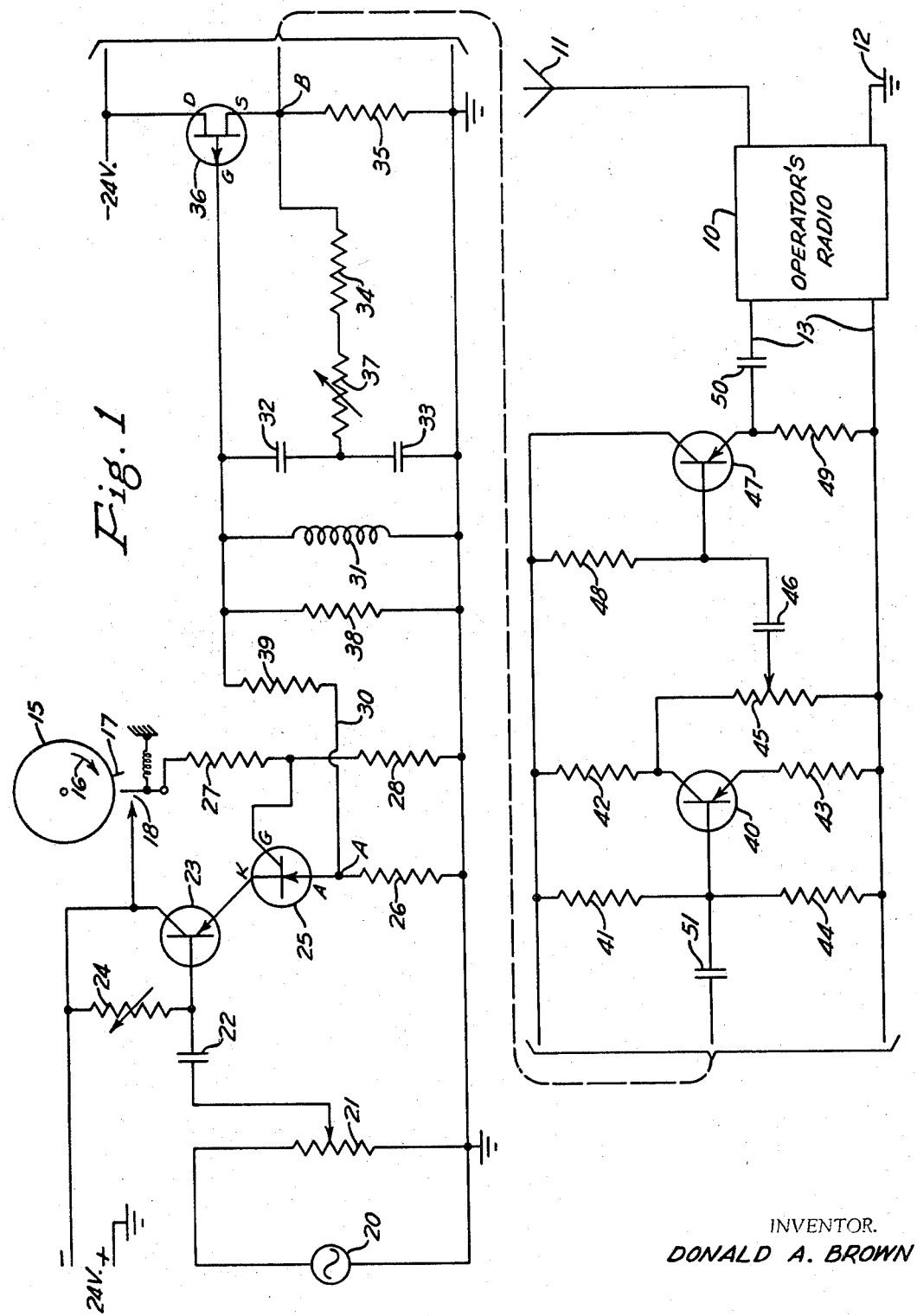

It is conventional in seismic shot-firing systems to employ a snap-action switch actuated by a cam on the seismograph recording drum. A steady A-C signal or tone is usually transmitted to the shot point via a conventional radio or wire communication channel and actuation of the switch functions to cut off transmission of the oscillator tone. At the receiving (shot point) end of the channel it is conventional for cessation of the oscillator tone to initiate the shot-firing current. Because of the nature and limitations of conventional communication equipment, especially radio transmitting and receiving apparatus, the electrical transient occurring in the receiver which transient represents the actuation of the switch at the transmitting station, may take a variety of shapes which ordinarily result in different small time delays before the shot actually fires. This invention provides auxiliary circuitry which in combination with the conventional communication, e.g. radio, circuitry operates in such manner as to equalize the time delays so that in all instances the actual shot moment occurs only a very small time after actuation of the switch. Moreover, the small remaining time delay is constant and is independent of normal service variations in the conventional radio or other communication equipment employed.

There are a number of factors involved in the remote firing by radio of a seismic shot. These factors have their origin in the nature of the operation and due to practical considerations are unavoidable. A well recognized problem is that the shot must not be accidentally fired by a burst of atmospheric static. This is commonly avoided by using a characteristic tone in the signaling system and usually the tone is cut off in order to signal that the shot is to be fired. Another problem arises because the radio transmitter is limited in the modulation of its carrier wave to the range 300 to 3,000 c.p.s. by regulation of the Federal Communications Commission. This limitation imposes certain filter characteristics on the radio transmitter. A further problem is that conventional radio communication equipment is usually not of a precision quality and variations occur between different radio sets and even in the same set of equipment as change takes place in age, temperature, humidity, battery condition, and the like. While such changes normally do not interfere with speech transmission, they may have a profound effect when it is desired to transmit a timed signal with a high degree of time precision.

It is known that whenever one attempts to transmit a sudden signal having the nature of an electrical transient, as for example cessation of the tone signal mentioned above, over a communication channel one finds that the resulting output signal is not the input signal but is an altered signal that has the shape of a characteristic weighting function for the apparatus of the signal channel into which the original transient was introduced. Moreover in conventional apparatus for cutting off a tone, the actual input signal may vary depending on the exact phase of the A-C tone signal where cut-off occurs, thereby giving rise to varying weighting functions at the output. The weighting function will also vary with characteristics of the equipment. All these variations in the weighting function, i.e. the output signal, will give rise to varying delays in the observed transmission time of the transient and such variations are larger than desired in seismic prospecting operations. By employing this invention the final or overall weighting function of the system is made substantially independent of varying factors so that a high degree of time precision is obtained. In this invention the desired precision is obtained by employing a circuit herein termed a triggered-tuned circuit to be described in detail later.

It is common practice when radio is employed as a communication channel between a seismic operator at the recording truck and a shooter at the shot point, to perform a routine sequence of operations preparatory to firing the shot. Such conventional switching operations as switching the operator's radio from receive to transmit, disconnection of the operator's microphone, switching of the shooter's radio from transmit to receive, the shooter's testing of the electric blasting cap circuit, the shooter's arming of the shot-firing circuit, and the like, are conventional operations and will for the most part be omitted from the ensuing description of the subject invention in the interest of clarity and simplification.

In this invention the recording drum-actuated switch is connected in a circuit including a tank circuit that is tuned approximately to the tone frequency, the switch being connected in such manner that actuation of the switch closes a gate on the tone and simultaneously applies a step-function to the tank circuit, whereupon the tank circuit executes its weighting function response (to the step function), which weighting function is transmitted via the communication channel to the shot point. The tank circuit is designed with a Q value such that its weighting function is within the frequency band of reliable transmission by the signal channel equipment. The signal channel then merely provides for transmission of a signal within its capability and the signal (weighting function) is generated in the tank circuit separate from the communication equipment itself. Accordingly, the nature of the received signal is not dependent on characteristics of the signal channel equipment. The received signal is thus in no way haphazard, but is determined by the tank circuit alone and its characteristics can be accurately predetermined and are easily precisely maintained. Reception of the predetermined weighting function therefore initiates firing of the shot at an accurately repeatable time after closing of the recorder switch.

FIGURE 1 is a schematic wiring diagram of the seismic operator's equipment pertaining to this invention. The operator has a conventional radio transmitter 10 connected to antenna 11 and ground 12. The radio signal is modulated by the input signal at leads 13, which may also selectively connect to a conventional microphone (not shown) for speech transmission. The leads 13 are switched to the apparatus indicated in FIGURE 1 for shot-firing operation to be explained. The seismic operator also has a conventional recording drum 15 which rotates in the direction of arrow 16, and is provided with a cam indicated diagrammatically by 17 that at a specific point in the rotation of the drum closes a switch indicated diagrammatically at 18, this being conventional. The switch 18 may be a conventional microswitch or other electromechanically precise cam-actuated switch. When both operator and shooter are ready to fire the shot, the operator disconnects his microphone and connects the circuit of FIGURE 1 to the radio transmitter and brings the recording drum 15 up to speed. The circuit of FIGURE 1 includes an audio oscillator 20, which produces an A-C signal in the permissible frequency range of radio transmitter 10. It is preferred that the frequency be near the high-frequency end of the audio band, as for example 2,500 c.p.s. obtained from an electrically driven tuning fork. A volume control 21 is connected to the oscillator 20 and the slider of the volume control is connected through a coupling condenser 22 to the base of a transistor 23. A variable resistor 24 connects the base of transistor 23 to its collector which is also connected to one side of previously mentioned switch 18 and to −24 v. D-C supply voltage as indicated.

A silicon-controlled rectifier SCR 25 is connected as shown with its anode A connected through resistor 26 to ground and its cathode K connected in the polarity indicated to the emitter of transistor 23. The control terminal or gate G of SCR 25 is connected through resistor 27 to the other side of switch 18, and also through resistor 28 to ground. Prior to closure of switch 18, SCR 25 is conducting and the 2,500 c.p.s. A-C signal is delivered at lead 30 connected to resistor 26 as shown. It will be apparent that with the circuit of elements 20 to 28, and with switch 18 open there will be an A-C signal at junction A and there will also be a negative D-C potential on junction A. Upon closure of switch 18 the high negative bias applied to the gate G of SCR 25 makes the SCR 25 nonconducting whereupon both the A-C signal and the D-C potential disappear from junction A.

A tank circuit comprising inductor 31 and series condensers 32 and 33 is provided with a conventional Q-multiplier circuit comprising resistors 37, 34, 35, and field-effect transistor 36 whose gate G, source S, and drain D are connected as shown. Direct-current supply voltage (−24 v.) is supplied to the drain D of transistor 36 as indicated. The circuit of elements 31 to 38 is to produce a tuned circuit whose Q value may be adjusted in well-known manner. The condensers 32 and 33 are selected to tune the inductance 31 to approximately the frequency of the oscillator 20. The Q value may be adjusted by means of adjustable resistor 37 and by selection of resistor 38 shunting the series resistors 26 and 39, the combined resistance being preferably of a high value. The tank circuit comprising elements 31 to 38 is preferably made with high quality components and is adequately protected from moisture, etc. so that its characteristics are maintained constant with a reasonable degree of precision. By employing the Q-multiplier circuit it is possible to adjust the Q value of the tank circuit to a desired value under load. The Q value of the tank circuit comprising elements 31 to 38 and including also elements 26 and 39 is made sufficiently high so that the weighting function is reliably transmitted by the communication channel to be employed. The actual Q value employed will depend on the characteristics of the communication channel. For example, when using radio transmission, the Q value employed should result in a weighting function that is passed by the audio portion of the radio equipment employed without being seriously distorted. The value of resistor 38 limits the maximum value of Q that may be obtained in the circuit, and the value of resistor 34 limits the degree of multiplication attainable in the Q-multiplier, these resistors being provided in order that stability always be maintained. Accordingly, the circuit of elements 31 to 38 will always perform in a predetermined manner and when given a transient impulse will always respond with the same weighting function. The circuit is connected via resistor 39 and lead 30 to junction A previously mentioned.

Output signal from the high-Q tank circuit is obtained across resistor 35 and is amplified by the conventional amplifier circuit of transistor 40 including resistors 41, 42, 43, and 44 to which the tank circuit is coupled via condenser 51. Output of amplifier 40 is applied to a volume control 45 whose slider connects via coupling condenser 46 to the base of transistor 47 that is connected in a conventional emitter-follower circuit including resistors 48 and 49 connected as shown. The emitter follower 47 is coupled in conventional manner, as for example via condenser 50, to the input leads 13 of the operator's radio transmitter 10.

Operation of the circuit of FIGURE 1 is as follows. The circuit of transistor 23 may be considered to be an emitter follower when the SCR 25 is turned on. The latter is accomplished by applying the proper bias to SCR 25 through proper choice of resistor 28. In such case the A-C signal from oscillator 20 is delivered to lead 30, the amplitude of the signal being adjusted by means of the slider of volume control 21. A D-C voltage will also appear on lead 30 and the magnitude of this voltage may be adjusted by means of adjustable resistor 24. It is preferred that the D-C voltage on lead 30 be very much larger than the A-C component in order that there be no distortion of the A-C signal on lead 30 and for other reasons to be explained later. It is preferred that the peak to peak A-C swing be less than one-third of the D-C component, the latter being limited by the degree of modulation of the radio 10 as will be explained in more detail later.

Figure 3:
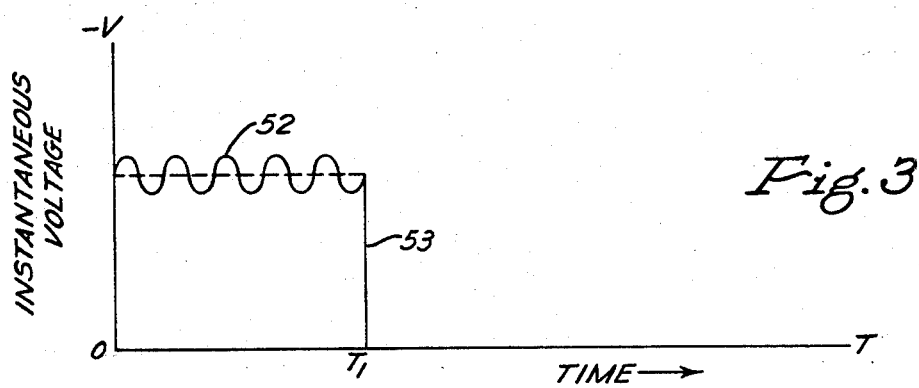
FIGURE 3 is a graph of the signal at junction point A of FIGURE 1.

The voltage appearing at junction A, i.e. on lead 30, prior to closure of switch 18 is illustrated by the portion 52 of the graph of FIGURE 3. Now when switch 18 is closed at time $T_1$, the bias on SCR 25 changes in such a way as to render SCR 25 nonconducting, thus opening the circuit between resistor 26 and transistor 23. The voltage at junction A is thus suddenly reduced to zero as illustrated by the sharp drop 53 of the graph of FIGURE 3. This introduces a step function voltage into the high-Q tank circuit comprising elements 31 to 38. The magnitude of the voltage step is determined by the voltage initially present across resistor 26 and by the relative values of resistors 26, 37, and 39. As a result of the step function thus applied to it, the tank circuit executes a response which corresponds to its weighting function, and this weighting function signal delivered at junction B is amplified and delivered via leads 13 to the modulator of radio 10 and transmitted.

Figure 4:
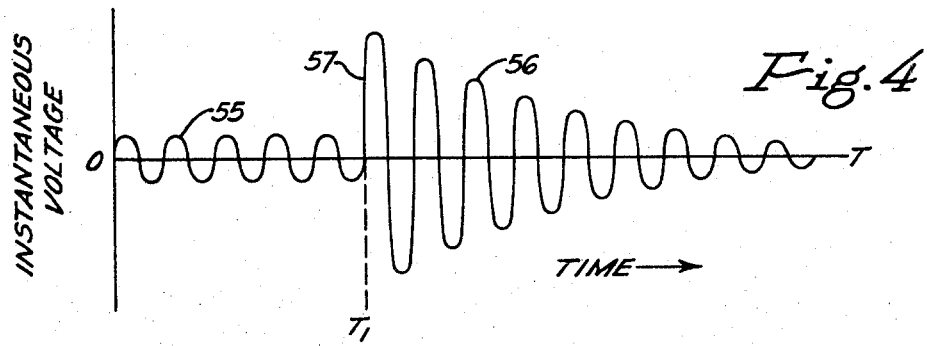
FIGURE 4 is a graph of the signal at junction point B of FIGURE 1.

FIGURE 4 is a graph illustrating the resulting A-C signal at the output of the tank circuit at junction B. The tank circuit responds to the tone 52 (FIGURE 3) from oscillator 20 as indicated at 55. Upon closure of switch 18 at time $T_1$, the step function 53, which is substantially larger than the tone signal, sets up in the tank circuit its weighting function response 56 which of course decays with time at a rate depending on the Q of the tank circuit. The direction of the first swing 57 of the weighting function will always be the same, and since the previous A-C signal is relatively small, the magnitude of the first swing 57 will be substantially independent of the particular phase of the A-C tone at which the switching takes place. Furthermore, since the frequency of the tone and the natural frequency of the tank circuit are relatively high compared to the degree of precision desired, any phase delay will be smaller than the desired one-half millisecond precision. Inasmuch as the tank circuit is tuned to have a frequency in the permissible modulation range of the radio transmitter, the radio will transmit the weighting function with a fair degree of fidelity. It is thus seen that the tone is cut off and at the same instant a step function is applied to the tank circuit which responds with its weighting function which is transmitted by the radio within the degree of time precision desired. In seismic operations in which a precision of one-half millisecond is desired, it has been found that a tone of 2,500 c.p.s. and a tank circuit tuned to approximately 2,500 c.p.s. and having a Q value of five or higher gives satisfactory results when using a commercial FM type geophysical-band radio.

Figure 2:
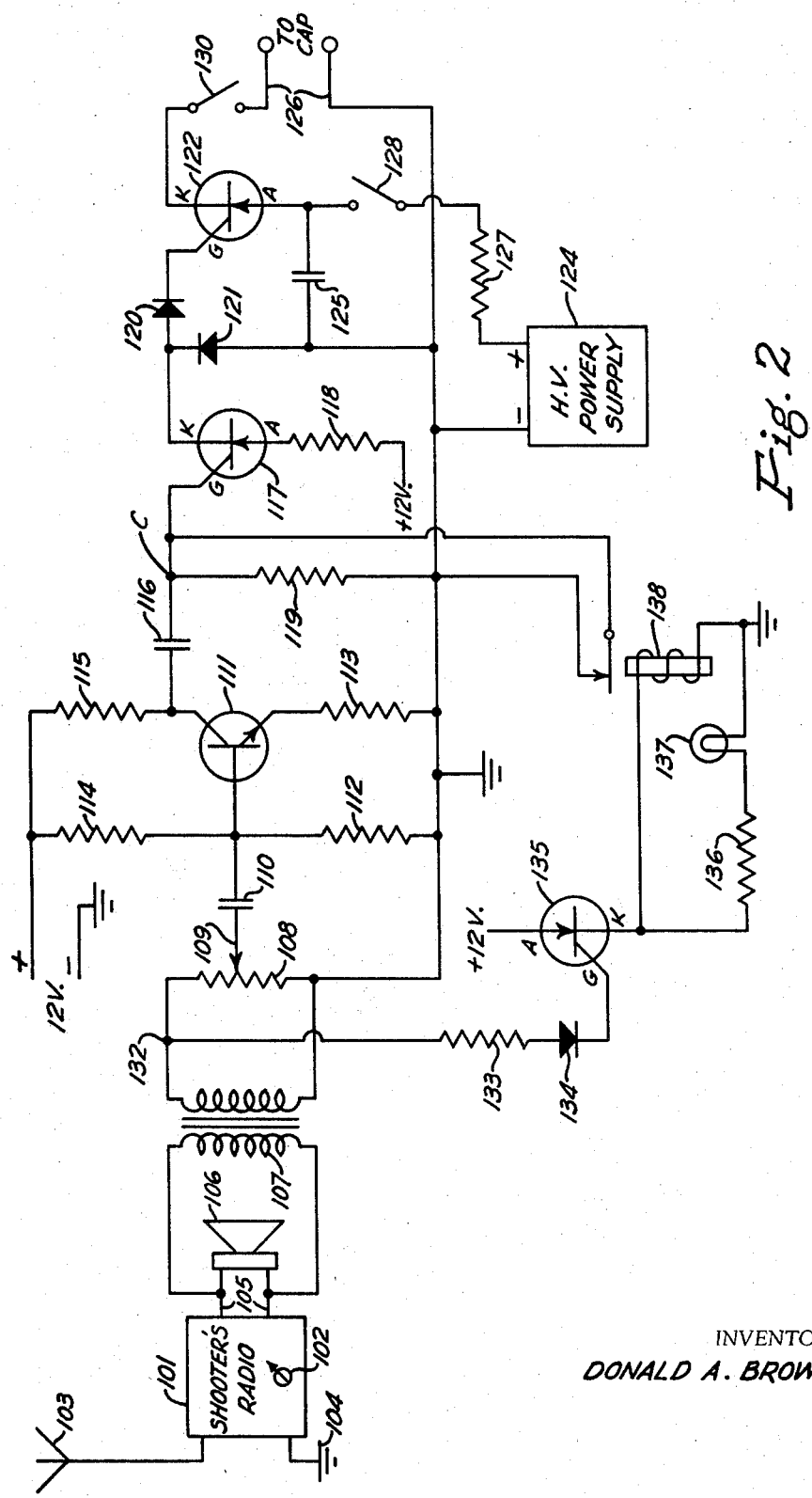
FIGURE 2 is a schematic wiring diagram of the apparatus employed at the shot point.

FIGURE 2 is a schematic wiring diagram of the shooter's equipment pertaining to this invention. The shooter's equipment includes a radio receiver 101 that is provided with a conventional volume control indicated by 102. The receiver 101 is provided with antenna 103 and ground connection 104. The audio output signal from receiver 101 is obtained from leads 105 to which a conventional loudspeaker 106 is connected. The shooter's equipment also includes a conventional radio transmitter (not shown) which has no function in the present invention and has therefore been omitted from FIGURE 2. Audio output signal from the radio transmitter is delivered via leads 105 to an isolation transformer 107, and a potentiometer 108 is connected to the secondary of transformer 107. The potentiometer slider 109 is connected via coupling condenser 110 to the base of transistor 111 in a conventional amplifier circuit including resistors 112, 113, 114, and 115 connected as shown. Resistors 114 and 115 connect to a +12 v. D-C power supply. Resistors 112 and 113 are connected to ground as indicated.

The signal output of transistor 111 passes via condenser 116 to the control electrode or gate G of a silicon-controlled rectifier SCR 117 whose anode A is connected via resistor 118 to +12 v. D-C power supply. The gate G or SCR 117 is also connected to ground through resistor 119 which is shunted by the contacts of a relay 138 whose function will be explained later. The cathode K of SCR 117 is connected to two diode rectifiers 120 and 121 in the polarity shown and to the gate G of silicon-controlled rectifier SCR 122. A condenser 125 of large capacity is connected in circuit as shown between the anode A of SCR 122 and ground. The condenser 125 is of sufficient capacity so that when charged from high-voltage power supply 124, the condenser 125 will store sufficient energy to fire a conventional electric blasting cap (not shown) connected to terminals 126 via a conventional firing line (not shown). The condenser 125 is charged from power supply 124 through current-limiting resistor 127 and switch 128, the latter being closed by the shooter for a short time sufficient to charge condenser 125 and opened prior to the actual shooting operation. Condenser 125 may comprise several condensers connected in parallel, and preferably comprises one or more electrolytic condensers of about 250 mfd. total capacity. The power supply 124 supplies D-C, as for example 90 volts and has one side grounded as shown. The cathode K of SCR 122 is connected to a safety switch 130 which is in series with the high side of the cap terminals 126 and the shooter must hold this switch closed during the shooting operation or else the cap will not fire. The rectifiers 120 and 121 serve as blocking devices to protect the SCR 117 from the severe voltage surge which occurs as the condenser 125 discharges through SCR 122 when the latter is made conductive by the application of a pulse to its gate G.

At the secondary of transformer 107 previously mentioned, the junction 132 is connected via a resistor 133 and diode rectifier 134 polarized as shown to the gate G of SCR 135 having its anode A connected to +12 v. D-C supply and its cathode K connected via fixed resistor 136 and a small incandescent lamp 137 to ground as shown. The coil of a normally-closed relay 138 is connected in parallel with the resistor 136 and lamp 137. The lamp 137 thus indicates to the shooter when relay 138 is energized. The normally-closed contacts of relay 138 are connected across the resistor 119 so that the relay contacts serve to tie to ground the control electrode or gate G of SCR 117 except when the relay 138 is energized. Provision is in this way made that firing cannot take place unless signal lamp 137 is lighted. The resistor 133 is selected so that the SCR 135 trips, i.e. becomes conducting, at a lower signal level than that required to trip SCR 117. The volume control 102 on the shooter's radio can thus be adjusted so that the previously mentioned steady tone received by radio from the operator's equipment of FIGURE 1 will light lamp 137 and open the relay contacts connected across resistor 119, but will not trip SCR 117. When the circuit of FIGURE 2 is in this condition, and with the condenser 125 previously charged by momentary closure of switch 128, and with safety switch 130 closed, firing of the cap, connected to leads 126 can take place upon reception of the first swing of the previously mentioned weighting function.

Operation of the circuit of FIGURE 2 will now be described. When the shot has been loaded, the firing circuit tested in conventional manner, and the shooter is ready to fire, and the operator is also ready to record, the shooter and operator will be in radio voice communication and each will be apprised of the other's readiness. When everything is in readiness, the shooter will turn off his transmitter and charge condenser 125 by momentarily closing and opening switch 128. The operator will turn on oscillator 20 and transmit the tone of about 2,500 c.p.s. which the shooter will hear on his loud speaker 106. The shooter will previously have adjusted his volume control 102 so that the tone signal is sufficient to just light lamp 137 thus removing the short circuit across resistor 119. This "enables" or "cocks" the firing circuit of FIGURE 2. The shooter then holds switch 130 closed and when the fire cam 17 on the operator's recorder drum 15 closes switch 18, the shooter's system receives the weighting function signal shown in FIGURE 4. The large signal swing on the first pulse of the weighting function will then trip SCR 117 which in turn puts a conducting control signal on the gate G of SCR 122 and the condenser 125 discharges through leads 126 to fire the cap (not shown) connected thereto.

Figure 5:
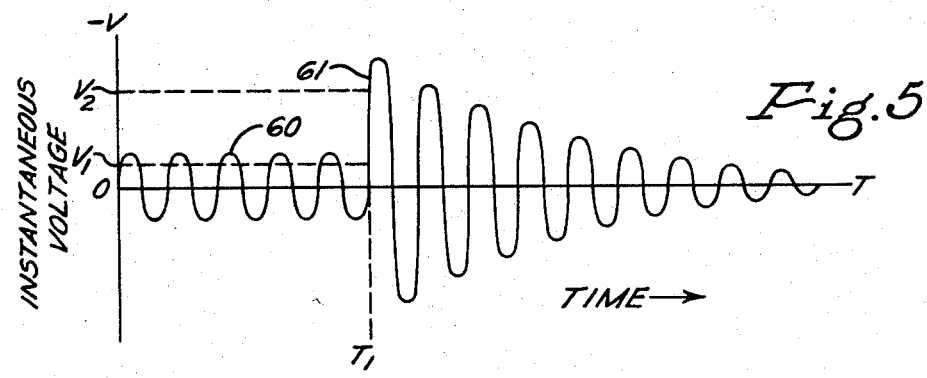
FIGURE 5 is a graph of the received signal at junction point C of the apparatus of FIGURE 2.

FIGURE 5 is a graph illustrating the signal at junction C of FIGURE 2. The threshold of SCR 135 is indicated by $V_1$ and the threshold of SCR 117 is indicated by $V_2$. The tone signal 60 received by the shooter is adjusted by means of volume control 102 so that the signal at junction C of FIGURE 2 exceeds the threshold $V_1$ on SCR 135 so as to energize relay 138 as indicated by signal lamp 137. Upon receiving the firing signal, i.e. 57 of FIGURE 4 the signal increases at 61 and exceeds the threshold $V_2$ thus making SCR 117 conducting which in turn makes SCR 122 conducting whereupon the shot is fired. It will be apparent that the volume control 102 should not be set at full volume for the signal 60 in order that the larger signal 61 should not seriously overload the shooter's receiver 101 and introduce distortion. The relative magnitude of signal 61 compared to signal 60 may be adjusted by means of potentiometer 108.

The slider 109 of potentiometer 108 is adjusted so that the peak of the first swing 61 of the received weighting function is substantially greater than the A-C tone 60, preferably about three times as large (as these signals would be observed, for example, on a C–R tube connected to junction C for test). The adjustment is such that the first swing 61 of the weighting function substantially exceeds the threshold $V_2$ of SCR 117. Accordingly, the point in time that the first swing 61 exceeds the threshold $V_2$ will lag the time $T_1$ by only a small fraction of a cycle of the A-C tone which is also the frequency to which the tank circuit is tuned and therefore the frequency of the weighting function of which swing 61 is a part. Consequently, the instant that the swing 61 exceeds the threshold $V_2$ is well within the desired degree of precision when operating at 2,500 c.p.s. It is apparent that in applications other than the seismic applications described here by way of example, any desired degree of precision can be attained by increasing the operating frequency. The communication system must of course be such as to be able to reliably transmit the operating frequency.

Figure 6:
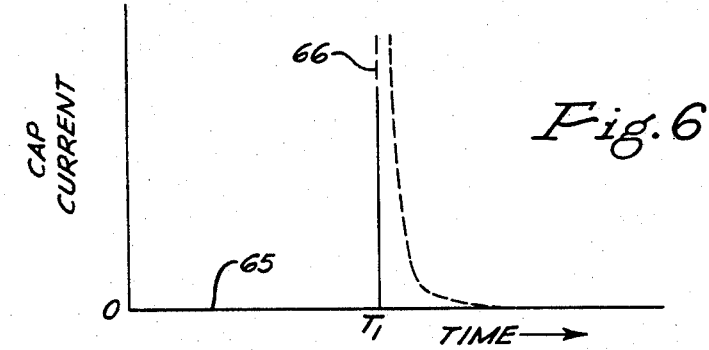
FIGURE 6 is a graph of the current through the $e-b$ cap to be fired.

A graph of the resulting current through the cap is illustrated in FIGURE 6. Initially SCR 122 is not conducting and no curent is supplied to cap leads 126 as indicated by 65 in FIGURE 6. When the SCR 122 becomes conducting, the condenser 125 discharges through the cap and SCR 122 and since this circuit has no appreciable inductance, the cap current quickly reaches a high value as indicated at 66 in FIGURE 6, and the cap fires.

The operation sequence is of course well rehearsed by both the shooter and the operator, and the latter will have started his recording drum in proper coordination as is customary in seismic shooting operations. After the shot fires and the seismic impulses have been recorded, the shooter and operator will again switch to voice communication in conventional manner.

By way of example, and not by way of limitation, elements having the following specifications have been employed in this invention with satisfactory results.

| Element | Component | Specification |
|---------|-----------|---------------|
| 20 | Oscillator | Melpar Series #30 Tuning Fork, 2,500 c.p.s. |
| 21 | Potentiometer | 50,000 ohms. |
| 22 | Condenser | 1 mfd. |
| 23 | Transistor | Type 2N1131. |
| 24 | Variable resistor | 500,000 ohms. |
| 25 | SCR | Type 2N2322. |
| 26 | Resistor | 510 ohms. |
| 27 | do | 5,100 ohms. |
| 28 | do | 1 megohm. |
| 31 | Inductance | Collins #MP-206-31B, 1 henry (approx.). |
| 32 | Condenser | Approx. .0082 mfd.[1] |
| 33 | do | Approx. .0082 mfd.[1] |
| 34 | Resistor | 10,000 ohms. |
| 35 | do | 24,000 ohms. |
| 36 | Field-effect transistor | Type 2N2386. |
| 37 | Variable resistor | 500,000 ohms. |
| 38 | Resistor | 100,000 ohms. |
| 39 | do | 100,000 ohms. |
| 40 | Transistor | Type 2N328A. |
| 41 | Resistor | 470,000 ohms. |
| 42 | do | 5,100 ohms. |
| 43 | do | 680 ohms. |
| 44 | do | 24,000 ohms. |
| 45 | Potentiometer | 50,000 ohms. |
| 46 | Condenser | 1 mfd. |
| 47 | Transistor | Type 2N1131. |
| 48 | Resistor | 30,000 ohms. |
| 49 | do | 2,000 ohms. |
| 50 | Condenser | 1 mfd. |
| 51 | do | 1 mfd. |
| 107 | Transformer | UTC type CG137. |
| 108 | Potentiometer | 1,000 ohms. |
| 110 | Condenser | 1 mfd. |
| 111 | Transistor | Type TI484. |
| 112 | Resistor | 15,000 ohms. |
| 113 | do | 2,700 ohms. |
| 114 | do | 43,000 ohms. |
| 115 | do | 8,200 ohms. |
| 116 | Condenser | .047 mfd. |
| 117 | SCR | Type 2N2322 or 2N2323. |
| 118 | Resistor | 240 ohms. |
| 119 | do | 5,100 ohms. |
| 120 | Rectifier | Type 1N2070. |
| 121 | do | Type 1N2070. |
| 122 | SCR | TI40A4 or TI40A2. |
| 124 | D-C power supply | 90 volts D-C. |
| 125 | Condenser | Mallory FP140, 250 mfd. |
| 127 | Resistor | 3,900 ohms. |
| 133 | do | 1,500 ohms. |
| 134 | Rectifier | Type 1N302. |
| 135 | SCR | Type 2N2322 or 2N2323. |
| 136 | Resistor | 130 ohms. |
| 137 | Lamp | Type 344. |
| 138 | Relay | Dunco RR1B, 12 v. |

[1] Selected to tune circuit to approx. 2,500 c.p.s.

What I claim as my invention is:

1. Apparatus for initiating an electric current at a remote location in response to actuation of a switch at an operator location within a predetermined period of time after actuation of said switch, comprising a communication channel comprising signal sending means at said operator location and signal receiving means at said remote location, a tuned circuit at said operator location having a characteristic weighting function, means interconnecting said switch and said tuned circuit, said signal sending means comprising means to send a first signal prior to actuation of said switch and means to simultaneously stop the sending of said first signal and to commence sending of said characteristic weighting function, said signal receiving means comprising first and second trigger circuit means, said first trigger circuit means being responsive to a first threshold value of a signal parameter less than the maximum value of said parameter of said first signal, and said second trigger circuit means being responsive to a second threshold value of said signal parameter less than the maximum value of said parameter of said characteristic weighting function, said second threshold value of said signal parameter being about three times as large as said first threshold value of said signal parameter.

2. The combination of claim 1, said signal parameter of said first and second signals comprising voltage amplitude.

3. The combination of claim 1, means at said remote location responsive to operation of said first trigger circuit means adapted to cock said remote location for reception of said characteristic weighting function, and means responsive to operation of said second trigger circuit means adapted to initiate said remote current.

4. The combination of claim 1, wherein said communication channel comprises a radio channel having a limited frequency pass band, and wherein said tuned circuit has a resonant frequency proximate the high-frequency end of said pass band.

5. The combination of claim 4, wherein said radio frequency pass band is an FM radio frequency pass band in the range of about 300 c.p.s. to about 3,000 c.p.s., and said tuned circuit resonant frequency is about 2,500 c.p.s.

6. The combination of claim 1, wherein said first signal comprises a steady A-C tone having a frequency substantially equal to the resonant frequency of said tuned circuit.

7. The combination of claim 1, wherein said remote location comprises a seismic shot hole, said second trigger circuit includes a condenser adapted to discharge explosive means in said hole upon operation of said second trigger circuit means.

References Cited

UNITED STATES PATENTS 3,040,298  6/1962  Thomas et al.
2,554,329  5/1951  Hammond.
3,327,304  6/1967  Willard.
2,307,771  1/1943  Denton et al.

JOHN W. CALDWELL, *Primary Examiner.*

H. PITTS, *Assistant Examiner.*

U.S. Cl. X.R.

181—.5